(12) United States Patent
Ikeda (10) Patent No.: US 6,840,521 B2
(45) Date of Patent: Jan. 11, 2005

(54) SEAL DEVICE

(75) Inventor: Yasuhiro Ikeda, Sakado (JP)

(73) Assignee: Eagle Industry Co., Ltd., Tokyo (JP)

( * ) Notice: Subject to any disclaimer, the term of this patent is extended or adjusted under 35 U.S.C. 154(b) by 0 days.

(21) Appl. No.: 10/272,993

(22) Filed: Oct. 18, 2002

(65) Prior Publication Data

US 2003/0075872 A1 Apr. 24, 2003

(30) Foreign Application Priority Data

Oct. 19, 2001 (JP) ......................................... 2001-321739

(51) Int. Cl.[7] ............................................. F16J 15/32
(52) U.S. Cl. ........................ 277/551; 277/549; 277/560; 277/562; 277/572
(58) Field of Search ................................ 277/549, 551, 277/560, 562, 572

(56) References Cited

U.S. PATENT DOCUMENTS 5,083,802 A * 1/1992 Shimasaki et al. .......... 277/560
6,367,810 B1 * 4/2002 Hatch ......................... 277/551
6,517,082 B2 * 2/2003 Yamada et al. ............. 277/559
6,517,083 B2 * 2/2003 Yamada et al. ............. 277/562
6,543,786 B2 * 4/2003 Osumi et al. ................ 277/549
6,565,096 B2 * 5/2003 Ikeda et al. ................. 277/551

* cited by examiner

Primary Examiner—Robert J. Sandy
Assistant Examiner—Enoch Reavey
(74) Attorney, Agent, or Firm—Arent Fox (57) ABSTRACT

The face pressure of a seal lip for sealing is made sharp to improve the sealing ability and the seal lip is prevented from being deformed abnormally when a shaft is inserted therein. In the constitution, the inside diameter of the corner face of the sealing face is smaller than the outside diameter of the shaft. When the outside surface of the support section of the support ring expands the expandable inner surface, the inside diameter of the sealing face is also expanded diametrically to closely contact the corner face of the sealing face with the shaft.

4 Claims, 8 Drawing Sheets

SEAL DEVICE

BACKGROUND OF THE INVENTION

1. Field of the Invention

This invention relates to a seal device for sealing a shaft by a seal lip, particularly to a seal device for sealing high pressure fluid by a seal lip against the high pressure thereof, wherein the sealing face of the seal device is configured not to deform abnormally when a shaft is fittingly inserted through the seal lip, so that the sealing face maintains to seal with its sharp face pressure.

2. Description of the Related Art

Figure 7:
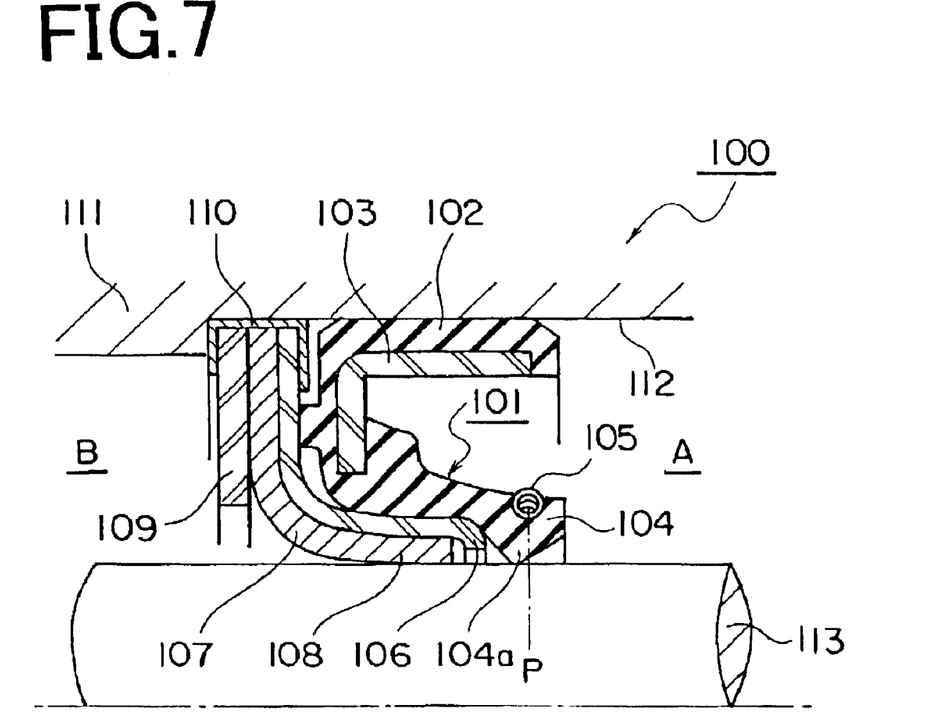
FIG. 7 is a half sectional view, showing the related art 1 of the present invention.

There has been a lip seal device 100 as the related art 1 of the present invention, as shown in FIG. 7.

FIG. 7 shows a half sectional view of the lip seal device 100. This lip seal device 100 is used for the compressor of a car cooler. Accordingly, this type of the lip seal device 100 is constituted in consideration of carbon dioxide gas as the fluid to be sealed, which has been adopted as an alternative of chlorofluorocarbon gas in view of the effect on the environment. The lip seal device 100 is therefore configured, as shown in FIG. 7.

In FIG. 7, the lip seal device 100 has a seal lip 101 that extends aslope toward the sealed fluid side A from a base section 102 in which an reinforcing ring 103 is embedded. At the distal end section 104 of the extended seal lip 101 is provided a sealing face 104a that closely contacts with the circumferential surface of a rotary shaft 113. A garter spring 105 for tightening the sealing face 104a is fitted in an annular groove that is provided in the outer surface of the end section 104. The axial position and dimensions of the sealing face 104a must be determined exactly and appropriately, relative to the annular groove in which the garter spring 105 is fitted.

Between the inner surface of the seal lip 101 and the rotary shaft 113 on the atmosphere side A is disposed a metal backup ring 106 in contact with or close to the seal lip 101. Additionally, on the atmosphere side A of the backup ring 106, an annular lip 107 of resin material that is conformed to the backup ring 106 is also disposed in the same way of the backup ring 106. Further, a support ring 109 is also disposed on the atmosphere side A of the annular lip 107. Then the backup ring 106, the annular lip 107 and the support ring 109 are sandwiched together by a retainer ring 110 having an inverted U-shape in cross section, resulting in a seal section 108 as a whole, for supporting the seal lip 101.

As the seal section 108 is located in parallel with the seal lip 101 and supports it against the pressure of the sealed fluid, the seal section 108 and the seal lip 101 cooperate to seal the fluid.

In this related art 1, the seal section 108 for supporting the seal lip 101 is disposed separately from and parallel to the seal lip 101. Accordingly, in view of the relationship between the tightening force of the garter spring 105 and the support force of the backup ring 106, if the seal lip 101 is incorrectly combined with the seal section 108 it is difficult to exactly mate the sealing face 104a with the surface of the rotary shaft 113 so as to secure to perform sealing ability with a face pressure. Furthermore, as the seal lip 101 is separated from the seal section 108, they must be fabricated individually, which causes the increase in the production cost.

In the manufacturing processes, the axial distance between the sealing face 104a at the distal end of the seal lip 101 and the annular groove must be exact. However, it is difficult to secure the distance to be uniform, because the seal lip 101 made of rubber is deformable.

Also, the backup ring 106 and the seal lip 101 must be combined exactly. If the backup ring 106 is forced to press against the seal lip 101, the inside diameter of the seal lip 101 is enlarged beyond the outside diameter of rotary shaft 113. This causes the sealing ability to worsen.

Figure 8:
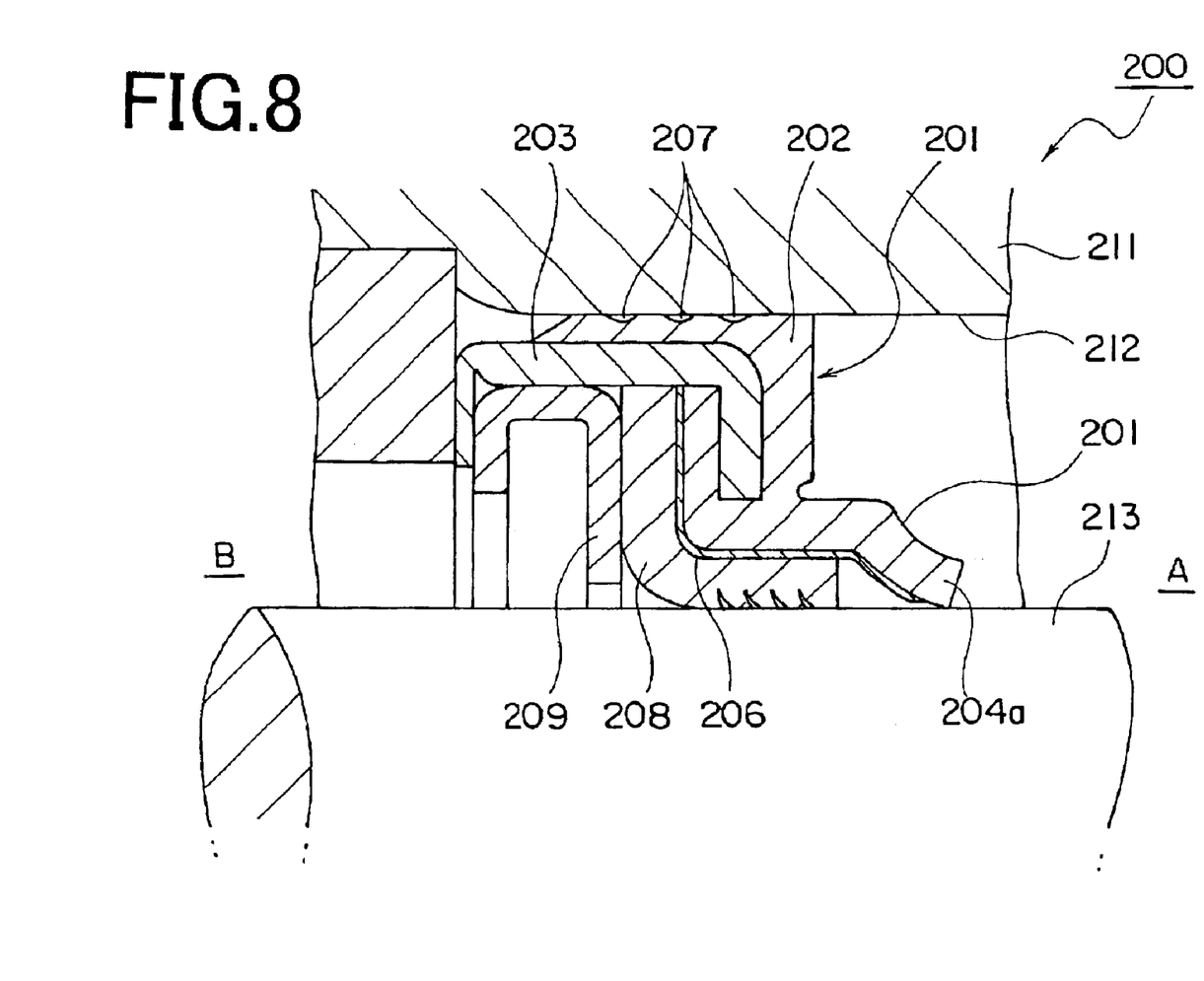
FIG. 8 is a half sectional view, showing the related art 2 of the present invention.

There has been a shaft seal device 200 as the related art 2 of the present invention, as shown in FIG. 8.

The shaft seal device 200 is constituted as shown in FIG. 8. FIG. 8 shows a half sectional view of the shaft seal device 200. This shaft seal device 200 is used for the compressor of a car cooler, in which the fluid to be sealed is carbon dioxide gas. This shaft seal device 200 is constituted, as a whole, similarly to the seal device 100 of the related art 1. However, the purpose for use of the backup ring 206 of the shaft seal device 200 is different from that of the backup ring 106 in the related art 1. In other words, it is disclosed in the related art 2 that a seal lip 201 and a seal section 208 are made into a body for the purpose of preventing the sealed fluid from passing through.

In this shaft seal device 200, a cylindrical seal lip 201 is formed so as to extend from the tight-fitting section 202 having an outer circumferential corrugated seal portion 207. The seal section 208 of resin is disposed on the atmosphere side A of the seal lip 201.

A metal sheet ring 206 is disposed between the seal lip 201 of rubber and the seal section 208 of resin, because the seal lip 201 allows carbon dioxide gas to penetrate therethrough. Accordingly, the metal sheet ring 206 is intervened between the seal lip 201 and the seal section 208 in such a way that it is attached to cover almost entire surface of the seal lip 201 on the atmosphere side A thereof.

However, it is difficult, in view of both the structure and strength, for the backup ring 206 of thin metal sheet to bear the seal lip 201 always in close contact with the rotary shaft 213. In other words, it is difficult for the constitution for preventing such penetration of carbon dioxide gas, to expand the seal lip 201 with the backup ring 206 against the strong elastic force applied to the sealing face 204a of the seal lip 201. Because the sealed gas becomes rapidly apt to penetrate by elongating and expanding the seal lip 201.

It is also difficult for the thin backup ring 206 having the purpose of avoiding such penetration to prevent the sealing face 204a subject to the pressure of the sealed fluid from deforming to be flat in pressure contact with the rotary shaft 213.

Additionally, as the backup ring 206 is a thin metal sheet, it is also difficult, in view of the structure, for the backup ring 206 to resiliently expand and retain the seal lip 201 so that the sealing face 204a of the seal lip 201 is optimally in pressure contact with the rotary shaft 213.

In the related arts as has been described, the sealed fluid will leak if the inner surface or the sealing face 104a, 204a of the seal lip 101, 201 are in close contact with the outer surface of the rotary shaft 113, 213 without a sharp face pressure when the seal device 100, 200 is fitted around the rotary shaft 113, 213. Accordingly, the seal device 100, 200 having the sealing face 104a, 204a the inside diameter of which is smaller than the outer diameter of the rotary shaft 113, 213 is only press-fitted to the rotary shaft 113, 213.

However, when the rotary shaft 113, 213 is press-fitted in the sealing face 104a, 204a of the seal lip 101, 201 made of rubber, it is difficult to make the sealing face 104a, 204a be optimally in close contact with the rotary shaft 113, 213, due to a large frictional resistance of rubber. Additionally, due to the frictional resistance, the seal lip 101, 201 is forced to elongate in the insertion direction, resulted in abnormal fitting in the state that the sealing face 104a, 204a is twisted around the rotary shaft 113, 213. In this state, the angle formed between the circumferential surface of the rotary shaft 113, 213 and the sealing face 104a, 204a is reduced. Therefore, the sealing face 104a, 204a fitting to the rotary shaft 113, 213 seals while a larger area of the sealing face 104a, 204a is in contact with the rotary shaft 113, 213. In this fitting state, the sealing ability is worsened due to the large contact area, thereby to cause the sealed fluid to leak.

When the sealing face 104a, 204a is forced to press strongly against the rotary shaft 113, 213, the contact area is increased and thus the inclination of the face pressure becomes gentle, thereby also to cause the sealing ability to be worsened. The frictional effect of the increased contact area promotes to produce sludge to reduce the sealing ability.

Further, when the pressure of the sealed fluid becomes high in the conditions described above, the friction between the sealing face 104a, 204a increases to facilitate the wear on the sealing face 104a, 204a.

The present invention is made in view of the problems as has been described and a technical problem to be solved by the present invention is to provide a seal device in which the sealing face of the seal device comes in close contact with the rotary shaft with a sharp face pressure when the rotary shaft is inserted in the seal device.

Another technical problem is to provide a seal device with sealing ability improved by contacting closely the seal section with the rotary shaft in the state of a sharp face pressure. Further another technical problem is to maintain the contact area of the sealing face not to be enlarged under the pressure applied to the sealing face from the sealed fluid and to prevent the wear on the sealing face.

SUMMARY OF THE INVENTION

The present invention has been made to solve the problems as mentioned above, and the technical means for solving the problems are constituted as below.

An preferred seal device according to the invention is a seal device for sealing a sealed fluid between a housing having a fitting bore and a shaft fitted thereto, comprising: an elastic seal lip of rubber-like material that extends and declines in an annular form from the press-fitting section that is press fitted in the fitting bore of housing to the shaft on the sealed fluid side and has a sealing face in close contact with the outer circumference of the shaft; and a support ring of certain material harder than the rubber-like material of the seal lip, that is held at its one end by the press-fitting section, extends cylindrically along the inner surface of the seal lip, and has a support section fitting in the expandable inner surface formed at the vicinity of the root of the sealing face; wherein the inner diameter of the corner face of the sealing face is smaller than the outside diameter of the shaft; and wherein the outside diameter of the support section of the support ring is larger than the inside diameter of the expandable inner surface and when the support ring is inserted to expand the expandable inner surface, the inside diameter of the corner face of the sealing face is also expanded, thereby to allow the corner face of the sealing face to closely contact with the shaft.

In the seal device according to the invention, the sealing face in its elastically tightening state is given contact area sufficient to attain sharp face pressure between the sealing face and the outer surface of the shaft by expanding the expandable inner surface of the seal lip on the sealing face side through the action of the outer surface of the support section of the support ring. Accordingly, the seal device is allowed to perform the sealing effect of the sealing face.

Also, as the sealing face closely contacts with the outer surface of the shaft with a sharp face pressure, the sealing face is prevented from being elongated by the shaft in its axial direction when the seal device is fitted to the shaft and it is therefore allowed to maintain the contact in the condition of sharp face pressure.

Further, the friction produced in the sealing face can be reduced enough to prevent the wear thereon by maintaining the contact condition of the sharp face pressure by the support section of the support ring. Because if a high pressure sealed fluid acts on the seal lip, then the sealing face is not brought in the state such that the contact area between the sealing face and the shaft is increased.

DETAILED DESCRIPTION OF THE INVENTION

Several preferred embodiments of the seal devices according to the invention will be described hereinafter in detail with reference to the accompanying drawings. Those drawings are prepared based on the exact design drawings.

Figure 1:
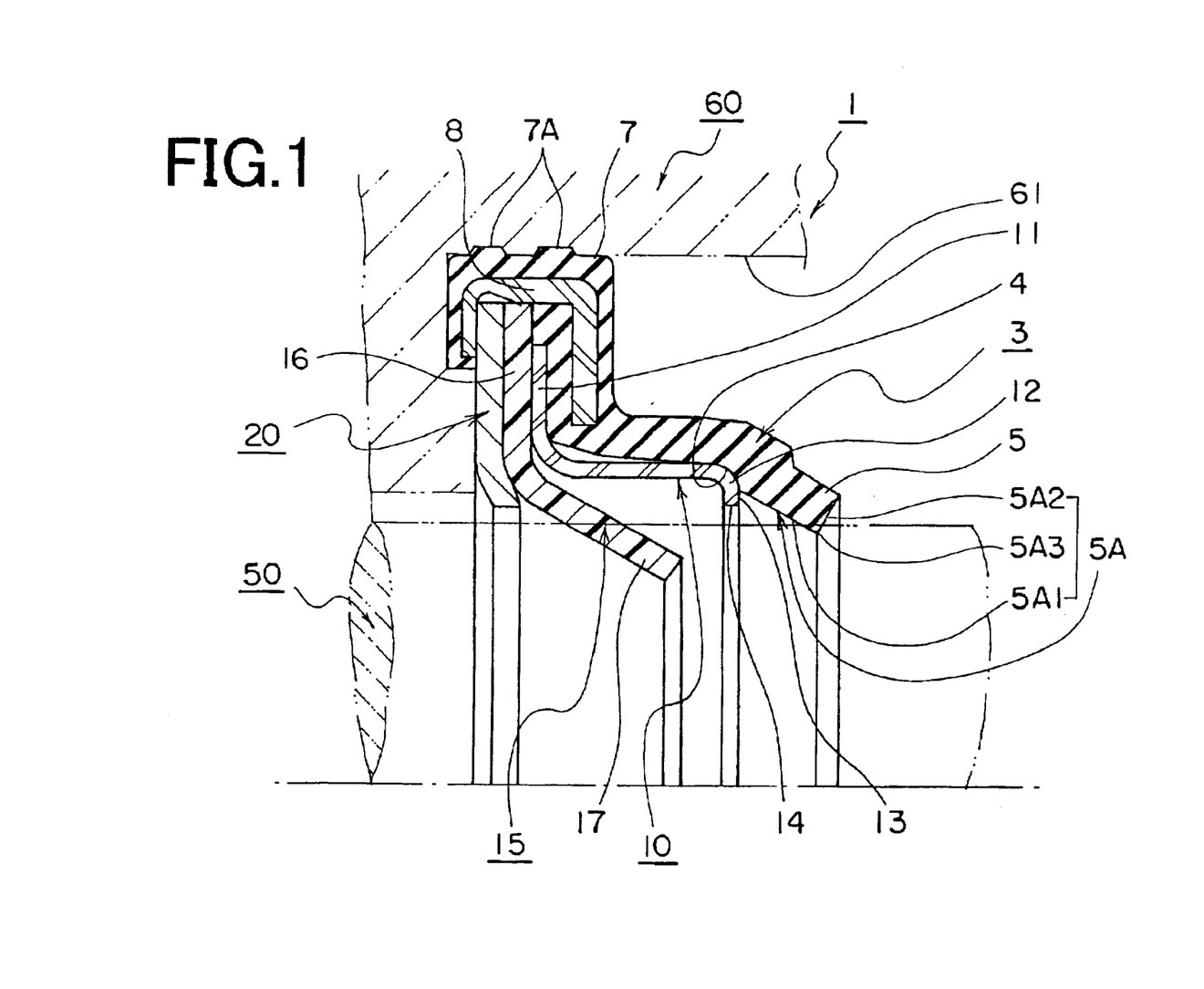
FIG. 1 is a half sectional view of first preferred embodiment of a seal device according to the invention, in which a rotary shaft is not mounted to the seal device.
Figure 2:
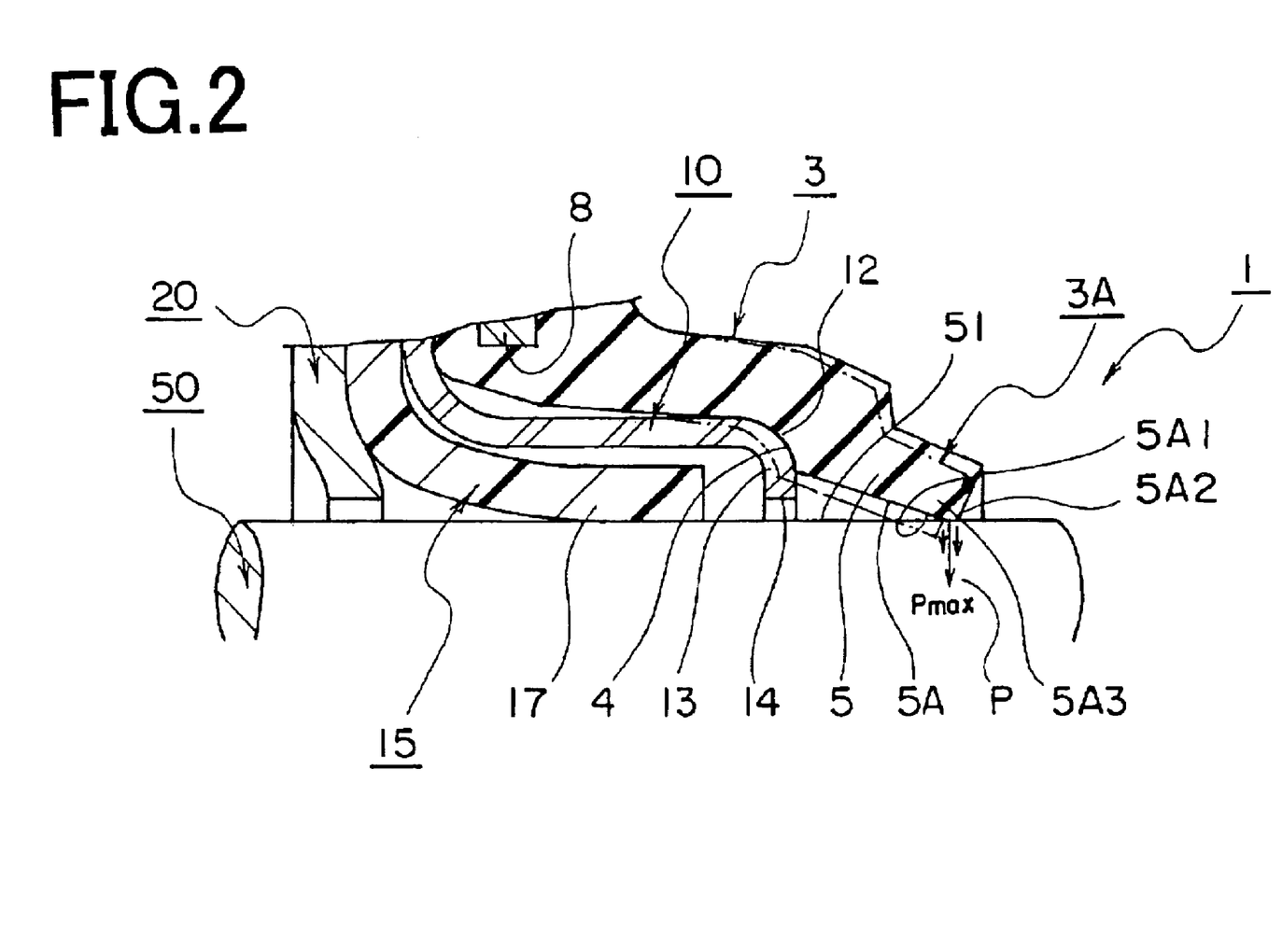
FIG. 2 is a half sectional view of the main part of the seal device on the rotational shaft side in FIG. 1, in which a rotary shaft is mounted to the seal device.

FIG. 1 is a half sectional view of first preferred embodiment of a seal device according to the invention, in which a rotary shaft is not mounted to the seal device and FIG. 2 is a sectional view of the seal device in FIG. 1 in which a rotary shaft is mounted to the seal device.

In FIG. 1, the reference numeral 1 denotes the seal device that is provided with a press-fitting section 7 of rubber. The press-fitting section 7 is press-fitted in a fitting bore 61 of a housing 60. In the outer surface of the press-fitting section 7 is formed convex seals 7A. Also, in the press-fitting section 7 is embedded a reinforcing ring 8 for securing the press-fitting to the housing 60 and for holding the combined components, such as the press-fitting section 7, a support ring 10 and a second seal lip 15.

A seal lip 3 made of rubber is formed cylindrically aslope from the press-fitting section 7 toward a rotary shaft 50 and is bonded to the reinforcing ring 8. At the inner extended end of the seal lip 3 is formed a sealing section 5 having an inner surface provided with a sealing face 5A in the shape of a triangle in cross section. The sealing face 5A includes an angular sealing face 5A1 on the atmosphere side B, an angular sealing face 5A2 on the sealed fluid side A, and a corner face 5A3 formed between the angular sealing face 5A1 on the atmosphere side B and the angular sealing face 5A2 on the sealed fluid side A. The corner face 5A3 closely contact with the rotary shaft 50 to generate a sharp face pressure Pmax in the distribution of the face pressure. As a result, the sealing ability is performed by this sharp face pressure.

An expandable inner surface 4 of an arc in cross section is formed at the root of the sealing section 5 in the seal lip 3.

On the surface of the seal lip 3 on the atmosphere side B is provided the support ring 10 of the same shape as in the inner surface of the seal lip 3 on the atmosphere side B. The support ring 10 has an outer retained part 11 that is sandwiched by the press-fitting section 7.

Further, a support section 12 in the shape of an arc in cross section is formed at the inner end of the support ring 10 so as to press-fit to the expandable inner surface 4 of the seal lip 3.

At the inner end of the support section 12 is formed with a ring section 13. The inside diameter of the hole having the inner surface 14 in the ring section 13 is determined to be enough to be spaced from the rotary shaft 50. The support ring 10 is formed by deep-drawing a metal plate into a cylinder with a flange corresponding to the outer retained part 11. Further, the support ring 10 is also formed to have the thickness enough to bear the seal lip 3 without deformation when the seal lip 3 is subject to the pressure of the sealed fluid.

Further, the second lip seal 15 of resin is provided on the surface of the support ring 10 on the atmosphere side B. The second seal lip 15 is formed with a retained ring section 16 extending radially outward and a lip section 17 extending radially inward and aslope from the retained ring section 16. When the rotary shaft 50 is press-fitted to the lip section 17, the lip section 17 is deformed into a straight cylindrical shape to seal the rotary shaft 50.

Additionally, a backup ring 20 is provided for bearing, on the atmosphere side B, the outer retained part 11 of the support ring 10 and the retained ring section 16 of the second seal lip 15. The backup ring 20 is made of metal and has the inner end that is bent so as to support the bent portion of the second seal lip 15.

The outer retained part 11 of the support ring 10, the retained ring section 16 of the second seal lip 15 and the outer section of the backup ring 20 are together sandwiched from both sides by the reinforcing ring 8 within the press-fitting section 7. The reinforcing ring 8 is partially enclosed with the rubber of the press-fitting section 7.

FIG. 2 is a sectional view of the main part of the seal device 1 in FIG. 1, in which a rotary shaft is mounted to the seal device 1.

The seal lip 3 shown by the phantom line in FIG. 2 is in its original state. Each inside diameter of the expandable inner surface 4 and the sealing face 5A of the seal lip 3 is small relative to the outside diameter of the rotary shaft 50, so that they can be expanded diametrically. If the support section 12 of the support ring 10 is press-fitted to the expandable inner section 4 of the seal lip 3 to expand the sealing section 5, then the seal lip 3 is elastically deformed as shown by the actual line in FIG. 2. The expandable inner surface 4 is expanded by the press-fitting insertion of the support section 12. With this expansion in the radial direction, the inside diameter of the sealing face 5A is enlarged in the range of 0.1 to 3.2 mm larger than the outside diameter of the original state.

The rate of the enlargement for the sealing face 5A is determined corresponding to the outside diameter of the rotary shaft 50. It is more preferable to expand the inside diameter of the sealing face 5A in the range of 0.1 to 2.2 mm larger than the original diameter. Further, the inside diameter of the sealing face 5A is determined to be smaller than the diameter of the rotary shaft 50 in the range of preferably 0.6 to 2.2 mm, more preferably 0.8 to 1.6 mm.

Also, when the support section 12 is press-fitted to the expandable inner surface 4, the angle of the angular sealing face 5A1 on the atmosphere side relative to the outer surface of the rotary shaft 50 becomes smaller than that of the angular sealing face 5A1 on the atmosphere side in the original state, as shown by the phantom line. Accordingly, it is easy to insert the rotary shaft 50 into the sealing face 5A. As a result, the insertion of the rotary shaft 50 into the sealing face 5A does not elongate the sealing section 5 in the insertion direction of the rotary shaft 50. This realizes a sharp face pressure for the corner face 5A3 in close contact with the rotary shaft 50 and the seal device 1 performs sealing ability.

Furthermore, when the support section 12 is press-fitted to the expandable inner surface 4, the corner face 5A3 is expanded in the radial direction within the interference or the shrink range relative to the rotary shaft 50. The face pressure of the corner face 5A3 produces a pressure distribution having a sharp Pmax and the sealing ability is performed effectively.

As the sealing section 5 is additionally tightened by the expansion of its inside diameter and the support section 12 bears the vicinity of the angular sealing face 5A1, pressure resistance is effectively performed even if the pressure of the sealed fluid strongly acts on the outer circumference of the sealing section 5. Further, the second seal lip 15 can seal the fluid leaking from the seal lip 3, causing the pressure within the sealing section 5 on the atmosphere side B to be increased. This allows the sealing section 5 to perform pressure resistance against the pressure of the sealing fluid.

Figure 3:
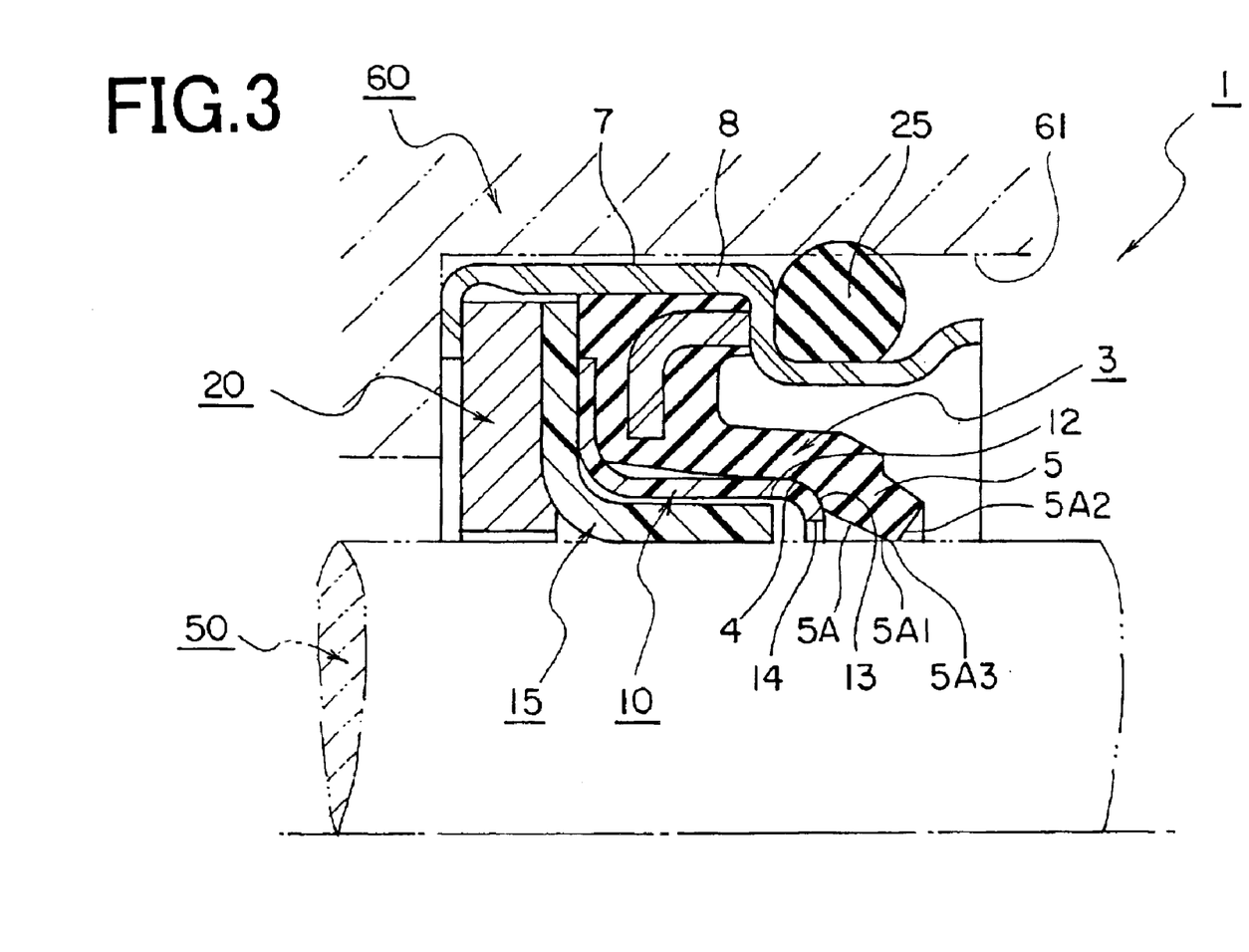
FIG. 3 is a half sectional view of second preferred embodiment of the seal device according to the invention, showing that a rotary shaft is mounted to the seal device.

FIG. 3 is a half sectional view of a seal device 1 as an second embodiment. In FIG. 3, the seal device 1 of this embodiment is different from that in FIG. 2 in that the press-fitting section 7 seals and fit via an O-ring to the press-fitting bore 61 of the housing 60 and the support ring 10 is made of resin.

The support ring 10 made of resin has higher elasticity, compared to metal support ring and gives composite elasticity to the seal lip 3. Accordingly, sealing ability is also performed. Furthermore, the support ring 10 made of resin prevents the contact surfaces from being worn because of its small sliding friction even if the support ring 10 of resin contacts or slides with the rotary shaft 50.

Therefore, the inner surface 14 of the support ring 10 can be slide-fitted to the rotary shaft 50. As a result, the sealing section 5 is effectively supported by the ring section 13 of the support ring 10. The pressure resistance at the sealing section 5 is performed against the pressure of the sealed fluid.

Figure 4:
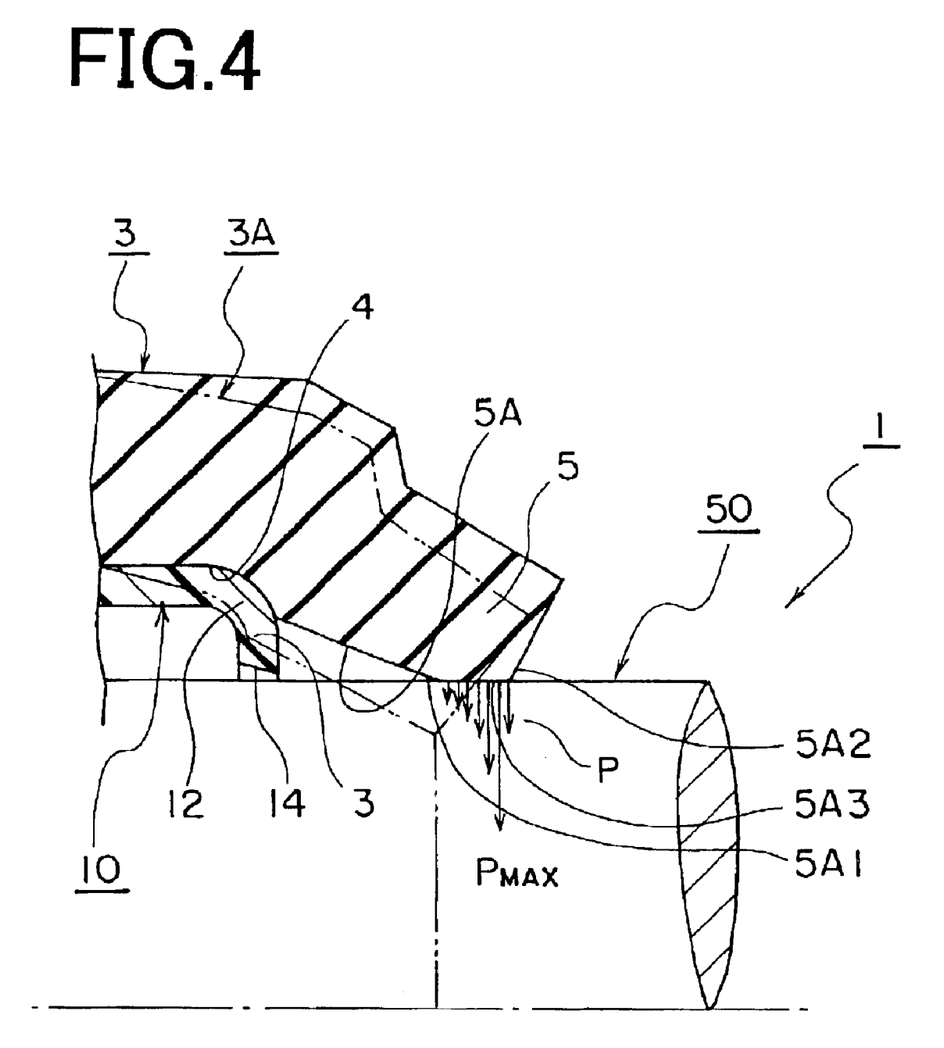
FIG. 4 is a half sectional view of the main part on the rotary shaft side of third preferred embodiment of the seal device according to the invention, in which a rotary shaft is mounted to the seal device.

FIG. 4 is a half sectional view of the main part of third embodiment of the seal device 1 according to the invention.

The seal lip 3A shown by the phantom line in FIG. 4 is in its original state. As shown in FIG. 4, if the support section 12 of the support ring 10 is press-fitted to the expandable inner section 4 of the seal lip 3, then the seal lip 3 is elastically deformed as shown by the actual line.

By press-fitting the support ring 10 in the expandable inner surface 4 of the seal lip 3, the corner face 5A3 of the sealing face 5A is also expanded diametrically. Therefore, the face pressure on the corner face 5A3 produces a pressure distribution having a sharp Pmax and the sealing ability with sharp face pressure Pmax is improved.

On the other hand, when the corner face 5A3 of the seal lip 3 in the state shown by the phantom line contacts with the rotary shaft 50, contact force of the corner face 5A3 is large and at the same time the contact area thereof is also increased, causing the face pressure distribution to be gentle. As a result, the sealing ability becomes poor.

The angle of the angular sealing face 5A1 on the atmosphere side B relative to the outer surface of the rotary shaft 50 becomes smaller than that of the angular sealing face 5A1 on the atmosphere side B in the original state, as shown by the phantom line. As a result, the insertion of the rotary shaft 50 into the sealing face 5A does not elongate the sealing section 5A therefore in the insertion direction of the rotary shaft 50 to deform abnormally the corner face 5A3. The sealing ability of the sealing face 5A is improved.

As the support ring 10 is made of resin, the inner surface 14 of the ring section 13 can be fitted to the rotary shaft 50. Furthermore, in order to facilitate the insertion of the rotary shaft 50 in the inner surface 14 and to reduce the contact area, the inner surface 14 is tapered in the direction of insertion. Thus the ring section 13 can bear the sealing section 5 if the pressure of the sealed fluid becomes high. Even if the inner surface 14 contacts with the rotary shaft 50, it is allowed to maintain the sliding resistance to be small. As a result, the resistance of the sealing face 5A to the pressure of the sealed fluid is improved.

Figure 5:
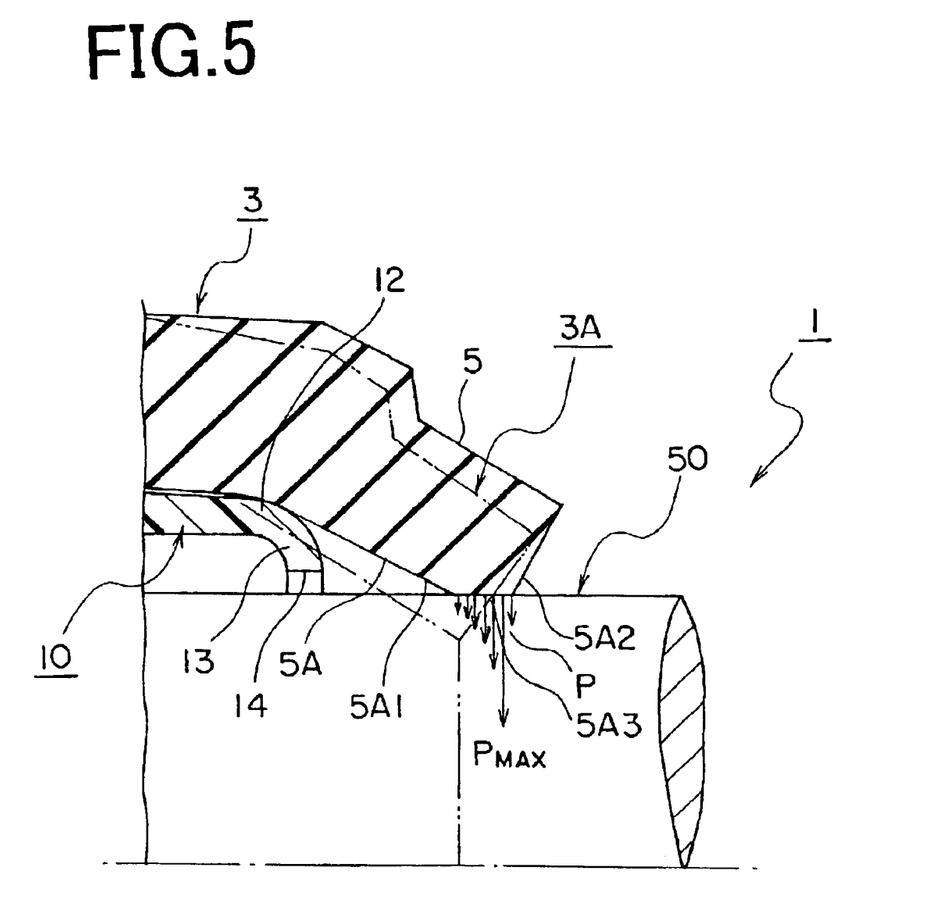
FIG. 5 is a half sectional view of the main part on the rotary shaft side of fourth preferred embodiment of the seal device according to the invention, in which a rotary shaft is mounted to the seal device.

FIG. 5 is a half sectional view of the main part of fourth embodiment of the seal device 1 according to the invention. The seal lip 3A shown by the phantom line in FIG. 5 is in its original state. The seal lip 3 shown by the actual line in FIG. 5 is in the state of its installation onto the rotary shaft 50. Additionally, the seal lip 3 shown in FIG. 5 has a tapered expandable inner surface 4.

On the other hand, the support section 12 of the support ring 10 is formed in the shape of an arc in cross section and, therefore, when the support ring 10 is press-fitted to the expandable inner surface 4, the sealing face 5A can be expanded relative to the rotary shaft 50. Although the support ring 10 is made of resin, it may be of metal, such as stainless steel, aluminium and steel.

If the tapered expandable inner surface 4 is adopted, it is easy to design of optional contact area of the corner face 5A3. The setting for the contact area of the corner face 5A3 allows the face pressure distribution P of the corner face 5A3 to have a sharp face pressure, such as the Pmax.

Also, The sealing face 5A1 on the atmosphere side B that is made inclined relative to the rotary shaft 50 will prevent abnormal deformation during insertion of rotary shaft 50, resulted in the improvement in the sealing ability of the sealing face 5A.

Figure 6:
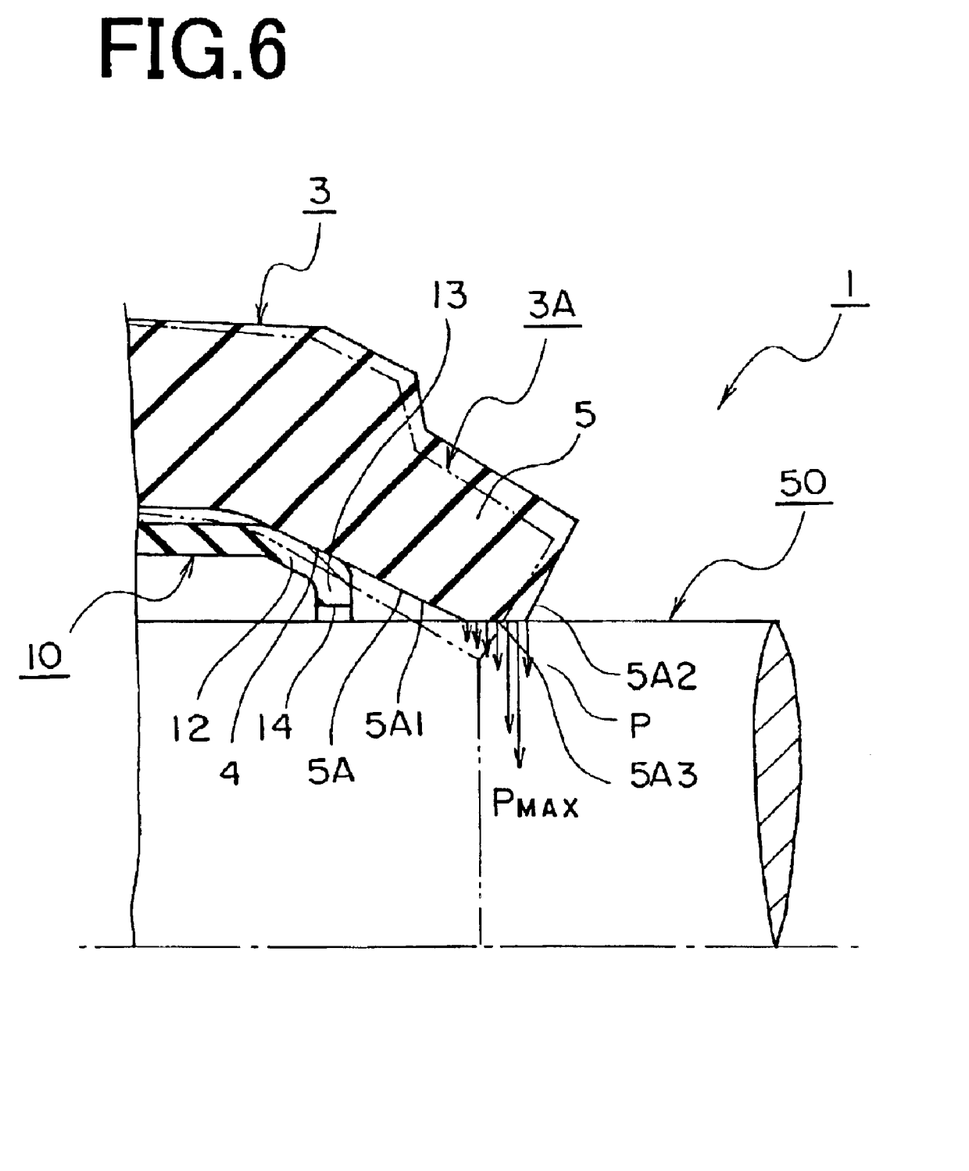
FIG. 6 is a half sectional view of the main part on the rotary shaft side of fifth preferred embodiment of the seal device according to the invention, in which a rotary shaft is mounted to the seal device.

FIG. 6 is a half sectional view of the main of fifth embodiment of the seal device 1 according to the invention. The seal lip 3A shown by the phantom line in FIG. 6 is in its original state. The seal lip 3 shown by the actual line in FIG. 6 is in the state of its installation onto the rotary shaft 50. As shown in FIG. 6, for the seal lip 3 similar to that in FIG. 5, there is provided a support ring 10 in which the outer surface of the support section 12 is partially tapered, the both ends of the tapered portions are bent to be arcuate and a ring section 13 is formed at one end.

With the constitution of the support section 12 described above, it is possible to set correctly the angle of the sealing face 5A1 to the rotary shaft 50 on the atmosphere side. As the support ring 10 is also made of resin, the inner surface 14 can be located close to the rotary shaft 50.

Now, further preferred embodiments of the invention will be described hereinafter.

A seal device of the second embodiment according to the invention is characterized in that the outside diameter of the support section of the support ring is determined in a dimensional relationship that the inside diameter of the sealing face is expanded a range of 0.1 to 2.2 mm; and the inside diameter of the corner face of the sealing face is determined to be a range of 0.6 to 2.2 mm smaller than the outside diameter of the shaft.

As the inside diameter of the corner face of the sealing face is expanded in the range of 0.1 to 2.2 mm and the sealing force is maintained corresponding to the interference of 0.4 mm or more, the sealing effect is performed in optimum condition.

Also, as the corner face of the sealing face closely contacts with the outer circumference of the rotary shaft in the condition that the corner face is expanded 0.1 to 2.2 mm (corresponding to the interference) in its diameter, the sealing face is maintained to be in the state of tightening. Accordingly, the sealing face is prevented from contacting with the large area of the outer circumference of the rotary shaft, which causes the friction to be reduced and prevents wearing.

A seal device of the third embodiment according to the invention is characterized in that the sealing face has an angular sealing face on the atmosphere side, another angular sealing face on the sealed fluid side and a corner face between the angular sealing faces on the sides, each angular sealing faces having an angle to the axial direction of the shaft; the angle between the angular sealing face on the atmosphere side and the shaft is reduced with deformation when the support section of the support ring is inserted to fit in the expandable inner surface.

In the seal device of the third embodiment according to the invention, when the expandable inner surface of the seal lip is expanded by the support section, the diameter of the sealing face is increased and the angle of the sealing face to the rotary shaft on the atmosphere side corresponding to the insertion side is elastically changed to the angle adapted to insert. Therefore, the insertion of the rotary shaft does not elongate the sealing face in the insertion direction of the rotary shaft to deform abnormally. This realizes a sharp face pressure for the corner face in sealing contact with the rotary shaft and prevents, without the increase in the contact area, the sealing face from being worn.

A seal device of the fourth embodiment according to the invention is characterized in that the support ring is made of resin material; and the support section is formed in the shape of an arc in cross section and fittingly inserted in the expandable inner surface.

In the seal device of the fourth embodiment according to the invention, the support ring is made of resin. Accordingly, it is possible for the resin-made-support section of the support ring in cooperation with the rubber-made expandable inner surface of the seal lip press-fitted thereto, to perform sealing ability as a rubber like elastic member having composite elasticity. As a result, when the support section is inserted in the expandable inner surface, both elastically deform and the friction generated therebetween can be therefore reduced. Furthermore, the sealing face is prevented from being elongated in the insertion direction of the rotary shaft, because both are deformable. Additionally, as the support section supports at the vicinity of the sealing face, the sealing face is prevented from being pressed against the rotary shaft during application of pressure of the sealed fluid.

A seal device of the fifth embodiment according to the invention is characterized in that the distal end of the support section is formed into a ring section, approximately normal to the axial direction; and the inner end surface of the ring section is loose-fitted to the shaft.

In the seal device of the fifth embodiment according to the invention, even if the inner circumference of the support ring to which the rotary shaft is fitted, contacts with rotary shaft, the sealing face can be supported effectively, because the support ring is made of resin and the friction resistance generated is small. Accordingly, the support section can be located close to the sealing face and thus prevented from being worn by pressure contact under the application of pressure of the sealed fluid.

According to the seal devices according to the invention as has been described, it is expected to attain such superior effects as described hereinafter.

According to the first embodiment of the invention, a superior effect of the sealing face in the seal lip of the seal device can be attained by press-fitting the support section of the support ring to the expandable inner surface of the seal lip and then contacting the corner face of the sealing face in the state of tightening, with the outer circumference of the rotary shaft in the condition of a sharp face pressure.

Furthermore, another sealing effect is provided, wherein because the sealing face can contact with a small area of the rotary shaft, the sealing face is not elongated in the insertion direction of the rotary shaft and prevented from being deformed abnormally when the rotary shaft is inserted in the seal device and the corner face maintains to contact with a sharp face pressure.

Additionally, another yet effect to prevent wearing from the friction of the sealing face, wherein because the corner face of the sealing surface is extended diametrically through the support section of the support ring and maintained to contact with a sharp face pressure, the sealing face is not brought into the state that the sealing face contacts with the increased contact area of the rotary shaft, resulted in small friction resistance.

According to the second embodiment of the invention, as the inside diameter of the corner face of the sealing section is expanded in the range of 0.1 to 2.2 mm and the sealing force is maintained corresponding to the interference of 0.4 mm or more, the sealing effect is performed in optimum condition.

Also, another effect is provided, wherein, as the corner face of the sealing face closely contacts with the outer circumference of the rotary shaft in the condition that the corner face is expanded 0.1 to 2.2 mm (corresponding to the interference) in its diameter, the sealing face maintained to be in the state of tightening.

Accordingly, the sealing face is prevented from contacting with the large area of the outer circumference of the rotary shaft. Thus, the sealing face provides an effect to reduce friction and to prevent wearing.

According to the third embodiment of the invention, an effect of prevention of abnormal deformation in the corner face, wherein, when the expandable inner surface of the seal lip is expanded by the support section, the diameter of the sealing face is increased and the angle of the sealing face to the rotary shaft on the atmosphere side corresponding to the insertion side is elastically changed to the angle adapted to insert and, therefore, the insertion of the rotary shaft does not elongate the sealing section face in the insertion direction of the rotary shaft to deform abnormally.

Another effect of improvement of sealing ability is provided, wherein the corner face of the sealing face sealingly contacts with the outer circumference of the rotary shaft.

Another yet effect of preventing wear on the sealing face is also provided, wherein the contact area of the sealing face is not increased when high pressure of the sealed fluid is applied.

According to the fourth embodiment of the invention, the support ring is made of resin.

An effect is provided, wherein it is possible for the resin-made-support section of the support ring in cooperation with the rubber-made expandable inner surface of the seal lip press-fitted thereto, to perform sealing ability as a rubber like elastic member having composite elasticity.

Another effect is also provided, wherein, when the support section of resin is inserted in the expandable inner surface, both can elastically deform and the seal lip, especially the sealing section is prevented from being worn and damaged under the high pressure of the sealed fluid. Additionally, another yet effect is provided, wherein, as the support section supports at the vicinity of the sealing face, the sealing face is prevented from being pressed against the rotary shaft during application of pressure of the sealed fluid.

According to the fifth embodiment of the invention a effect us provided, wherein, even if the inner circumference of the support ring to which the rotary shaft is fitted, contacts with rotary shaft, the sealing face can be supported effectively, because the support ring is made of resin and the friction resistance generated is therefore small.

Another effect is also provided, wherein the sealing face is prevented from being worn by pressure contact under the application of pressure of the sealed fluid.

Having described specific embodiments of the invention ,however, the descriptions of these embodiments do not cover the whole scope of the present invention nor do they limit the invention to the aspects disclosed herein, and therefore it is apparent that various changes or modifications may be made from these embodiments.

The technical scope of the invention is specified by the claims.

What is claimed is:

1. A seal device for sealing a sealed fluid between a housing having a fitting bore and a shaft fitted thereto, comprising:

an elastic seal lip of rubber-like material that extends and declines in an annular form from the press-fitting section that is press fitted in the fitting bore of said housing to said shaft on the sealed fluid side and has a sealing face in close contact with the outer circumference of said shaft; and a support ring of certain material harder than the rubber-like material of said seal lip, that is held at its one end by said press-fitting section, extends cylindrically along the inner surface of said seal lip, and has a support section fitting in the expandable inner surface formed at the vicinity of the root of said sealing face;

wherein the inner diameter of the corner face of said sealing face is smaller than the outside diameter of said shaft; and wherein the outside diameter of the support section of said support ring is larger than the inside diameter of said expandable inner surface and when said support ring is inserted to expand said expandable inner surface, the inside diameter of the corner surface of said sealing face is also expanded, thereby to allow the corner face of said sealing face to closely contact with said shaft, even if the seal lip receives pressure from the sealed fluid, wherein the outside diameter of the support section of said support ring is determined in a dimensional relationship that the inside diameter of said sealing face is expanded a range of 0.1 to 2.2 mm; and the inside diameter of the corner face of said sealing face is determined to be a range of 0.6 to 2.2 mm smaller than the outside diameter of said shaft.

2. The seal device according to claim 1, wherein said sealing face has an angular sealing face on the atmosphere side, another angular sealing face on the sealed fluid side and a corner face between said angular sealing faces on said sides, each angular sealing faces having an angle to the axial direction of said shaft; said angle between the angular sealing face on the atmosphere side and said shaft is reduced with deformation when the support section of said support ring is inserted to fit in said expandable inner surface.

3. The seal device according to claim 1, wherein said support ring is made of resin material; and said support section is formed in the shape of an arc in cross section and fittingly inserted in said expandable inner surface.

4. The seal device according to claim 3, wherein the distal end of said support section is formed into a ring section, approximately normal to the axial direction; and the inner end surface of said ring section is loose-fitted to said shaft.

* * * * *